Dec. 13, 1955   J. BARROWS   2,726,817
WINDING MACHINE
Filed June 28, 1952   15 Sheets-Sheet 1

Inventor,
John Barrows,
by Heard, Smith, Porter + Chittick
Attys.

Dec. 13, 1955 J. BARROWS 2,726,817
WINDING MACHINE
Filed June 28, 1952 15 Sheets-Sheet 2
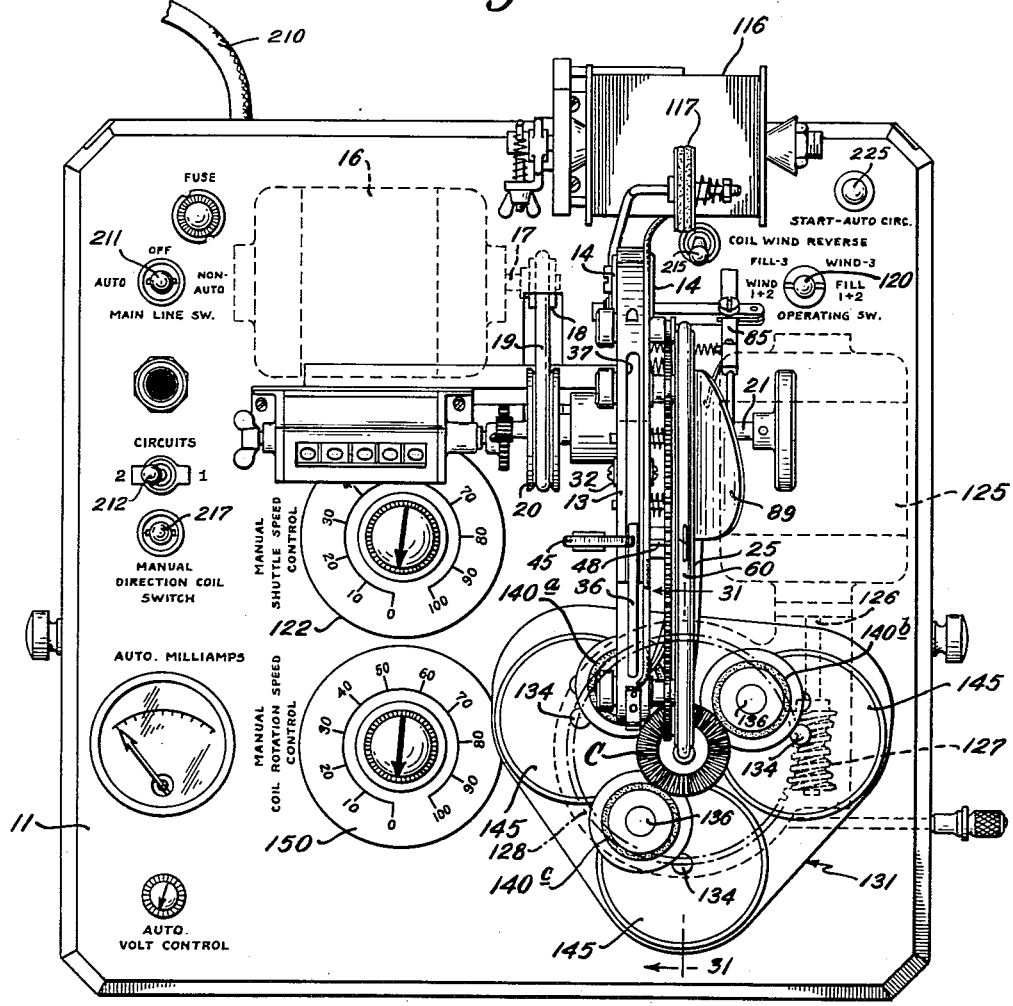
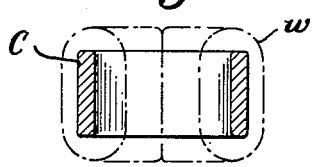
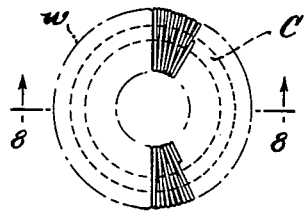
Inventor,
John Barrows,
by Head, Smith, Porter + Chittick
Attys.

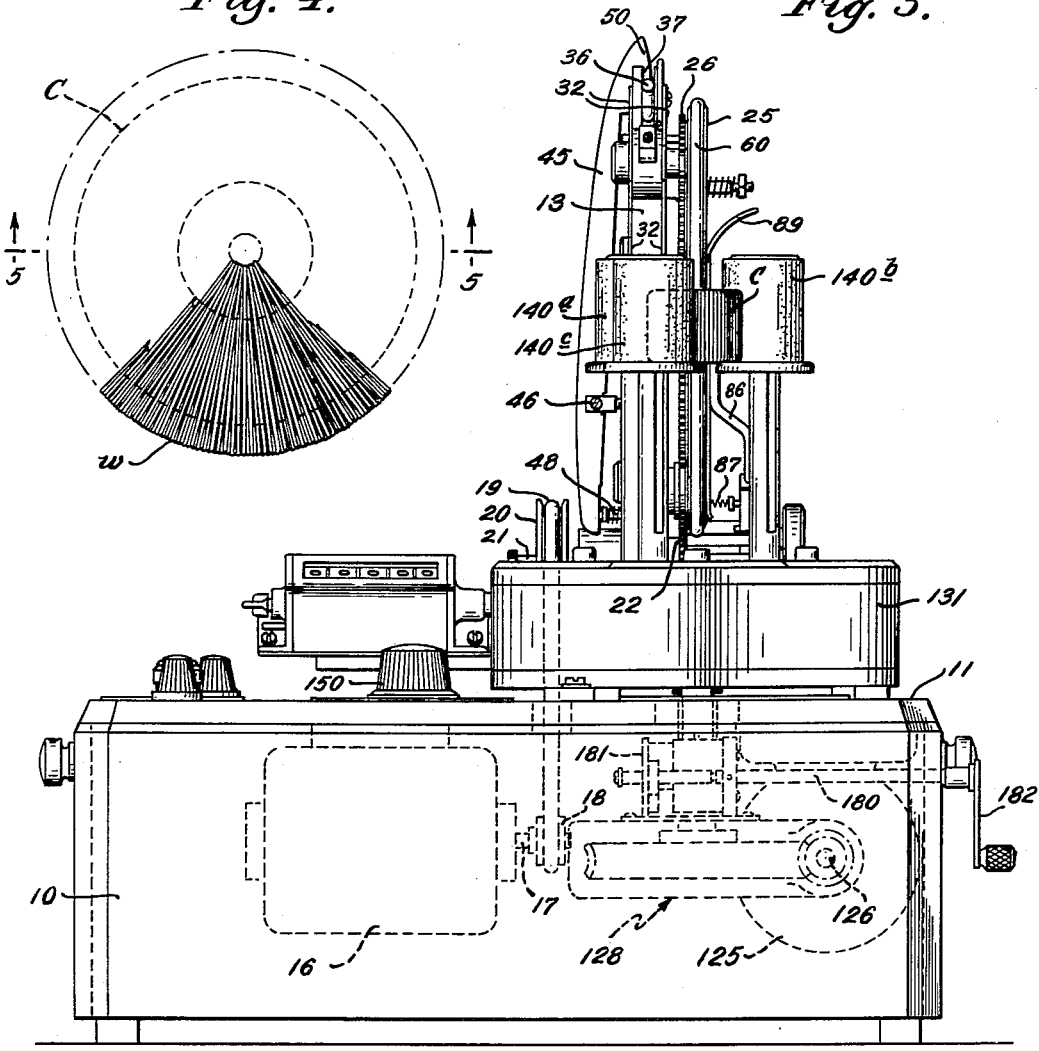

Dec. 13, 1955  J. BARROWS  2,726,817
WINDING MACHINE
Filed June 28, 1952  15 Sheets-Sheet 4

Inventor,
John Barrows,
by Heard, Smith, Porter & Chittick
Attys.

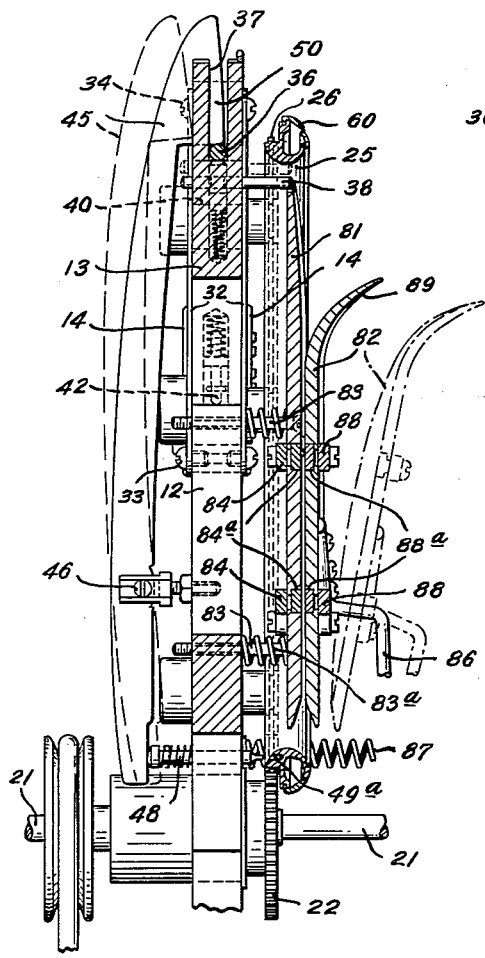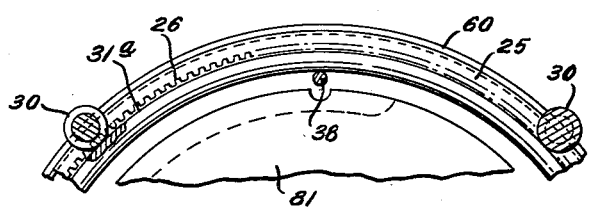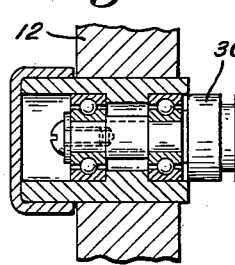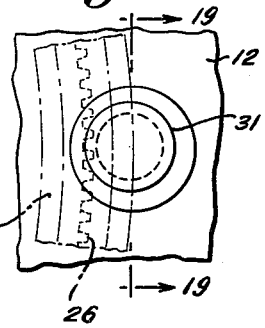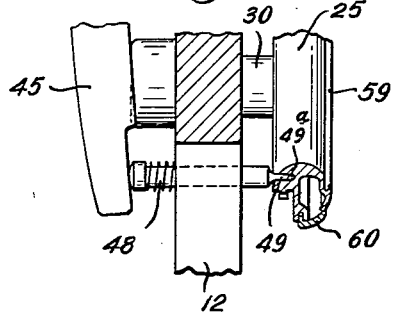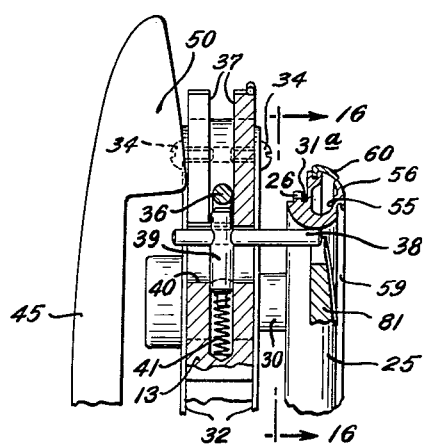

Dec. 13, 1955        J. BARROWS        2,726,817
                     WINDING MACHINE
Filed June 28, 1952                    15 Sheets-Sheet 6
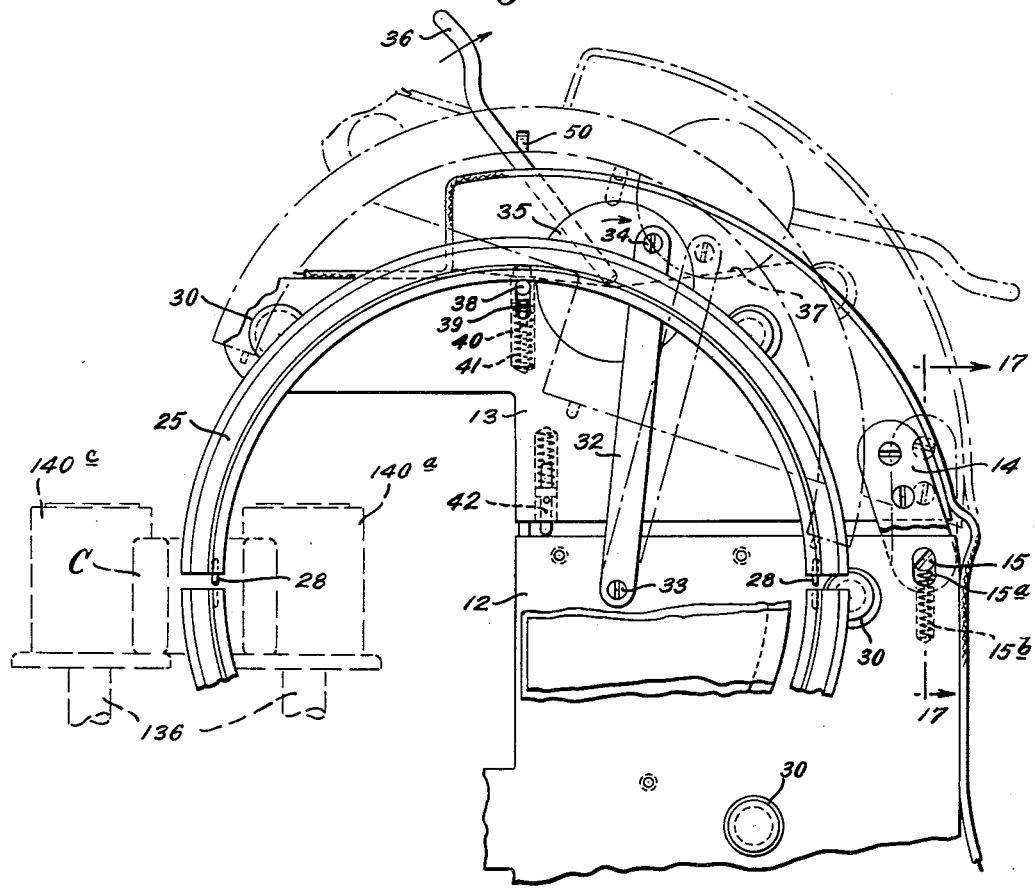
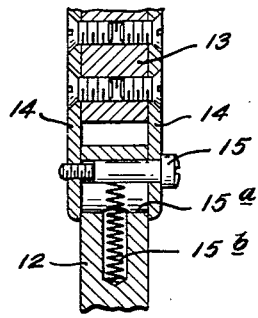
Inventor,
John Barrows,
by Heard, Smith, Porter + Chittick
Attys.

Dec. 13, 1955  J. BARROWS  2,726,817
WINDING MACHINE
Filed June 28, 1952  15 Sheets-Sheet 7
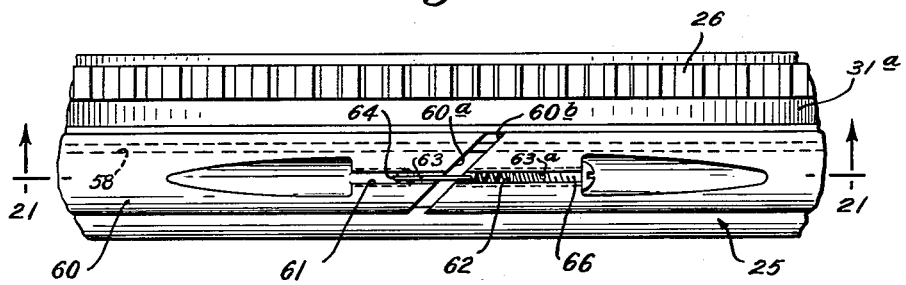
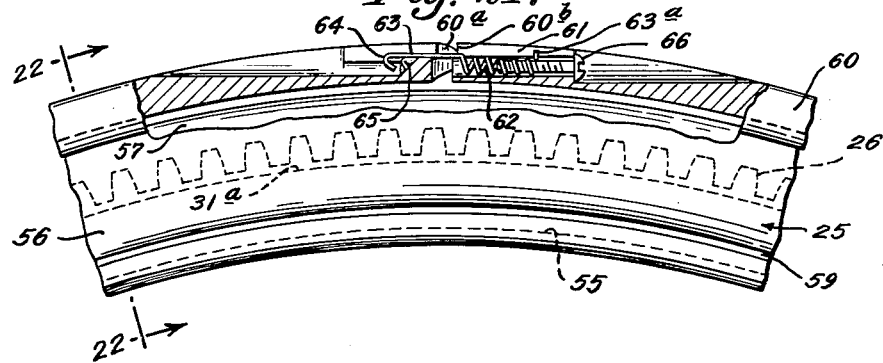
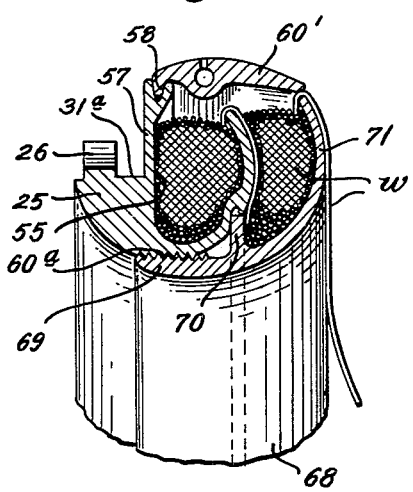
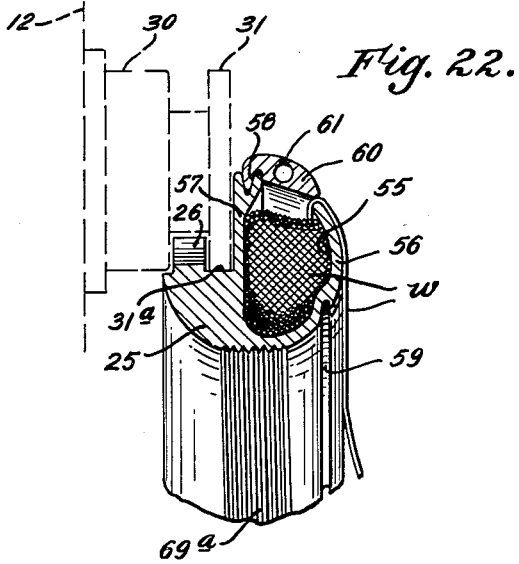
Inventor,
John Barrows,
by Heard, Smith, Porter + Chittick
Attys.

Dec. 13, 1955  J. BARROWS  2,726,817
WINDING MACHINE

Filed June 28, 1952  15 Sheets-Sheet 8

Inventor,
John Barrows,
by Heard, Smith, Porter & Chittick
Attys.

Dec. 13, 1955  J. BARROWS  2,726,817
WINDING MACHINE
Filed June 28, 1952  15 Sheets-Sheet 9
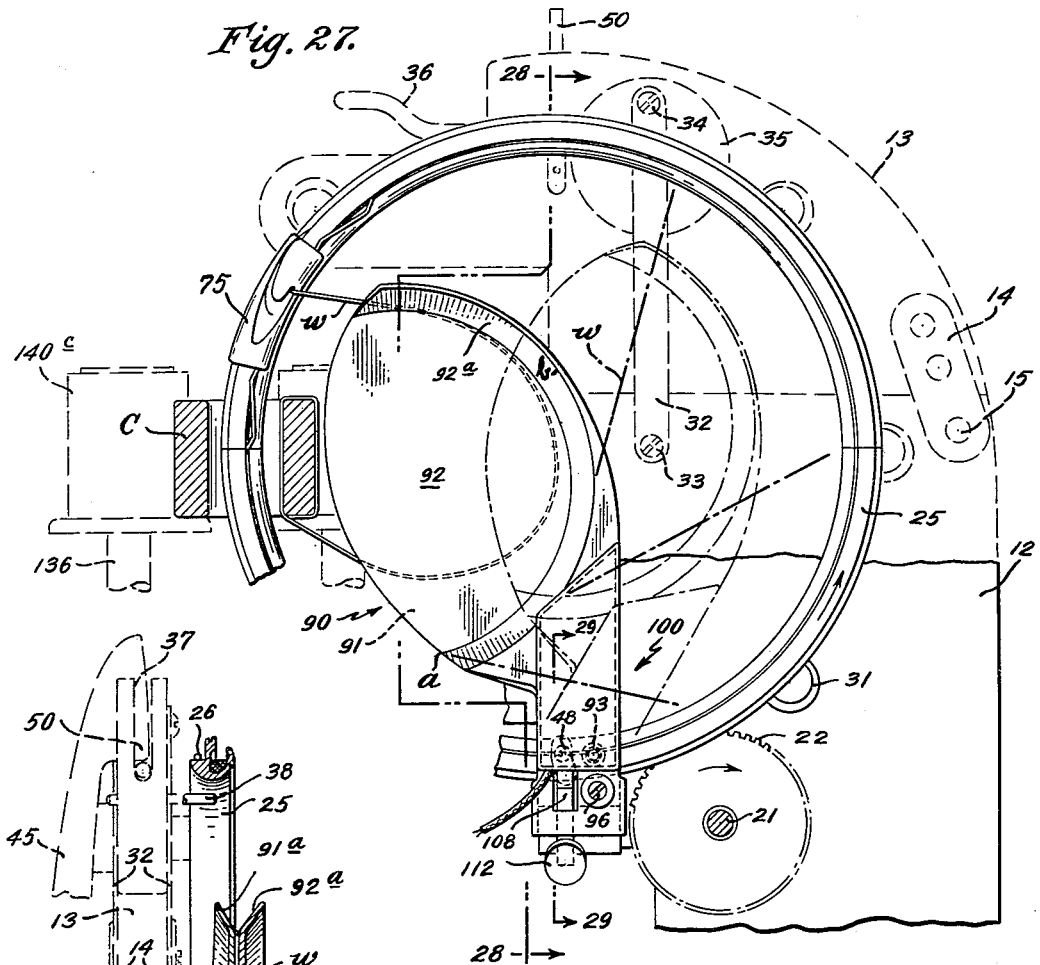
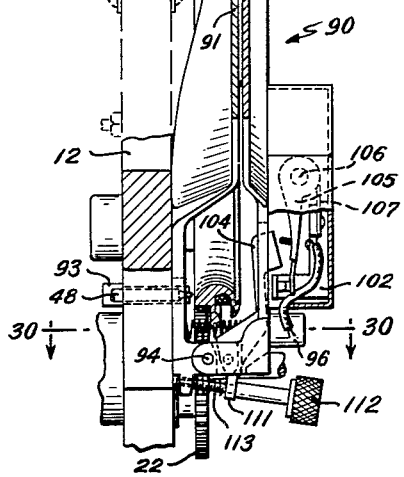
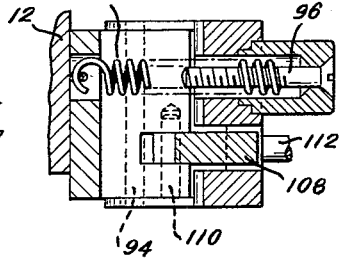
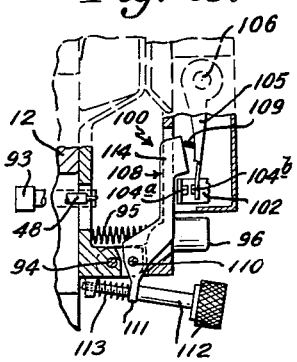
Inventor,
John Barrows,
by Head, Smith, Porter + Chittick
Att'ys.

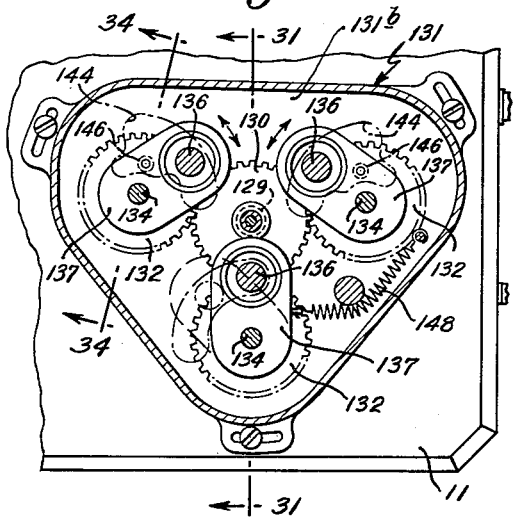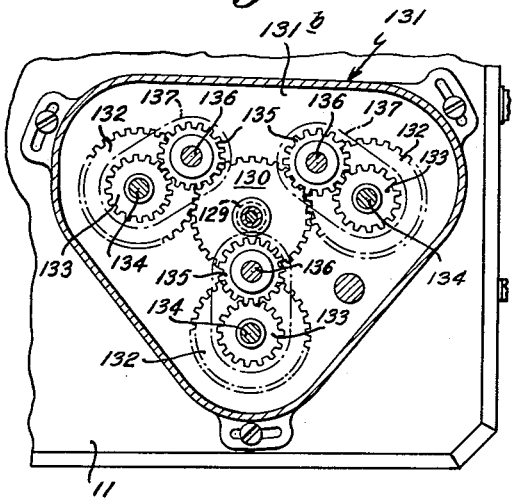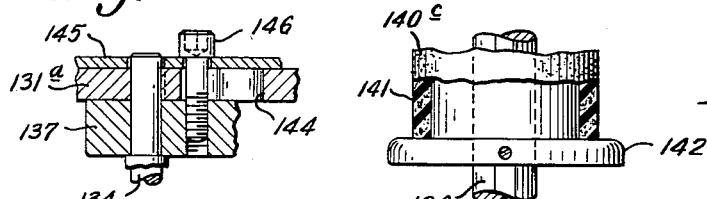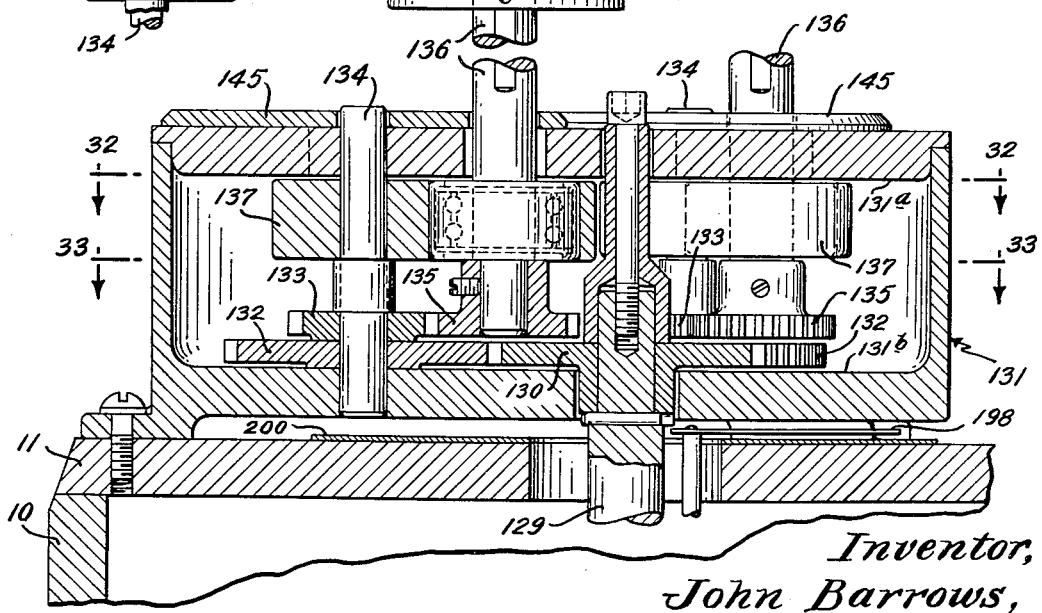

Dec. 13, 1955   J. BARROWS   2,726,817
WINDING MACHINE
Filed June 28, 1952   15 Sheets-Sheet 11
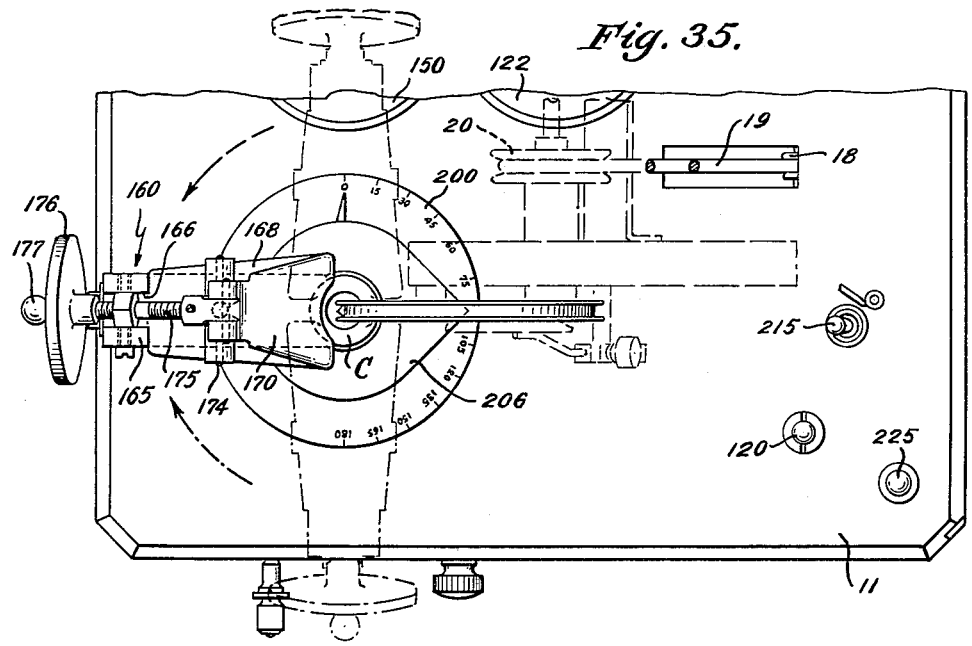
Fig. 35.
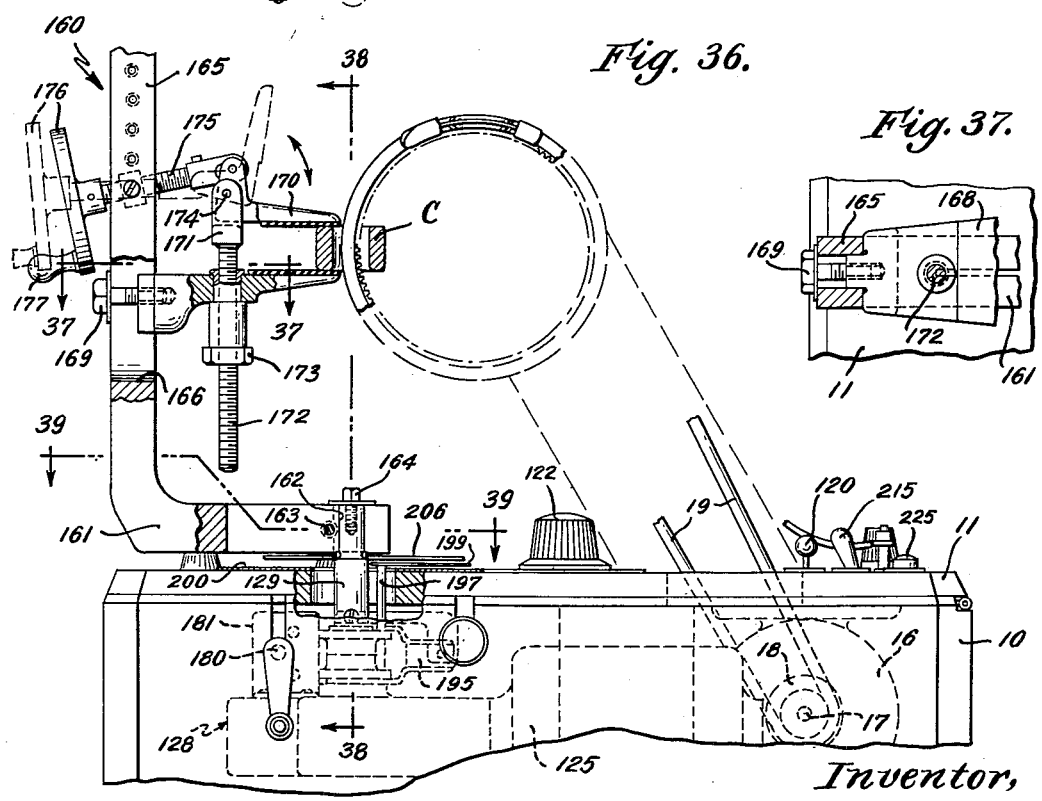
Fig. 36.
Fig. 37.
Inventor,
John Barrows,
by Heard, Smith, Porter & Chittick
Attys.

Dec. 13, 1955  J. BARROWS  2,726,817
WINDING MACHINE
Filed June 28, 1952  15 Sheets—Sheet 12

Inventor,
John Barrows,
by Heard, Smith, Porter + Chittick
Attys.

Dec. 13, 1955  J. BARROWS  2,726,817
WINDING MACHINE
Filed June 28, 1952  15 Sheets-Sheet 13
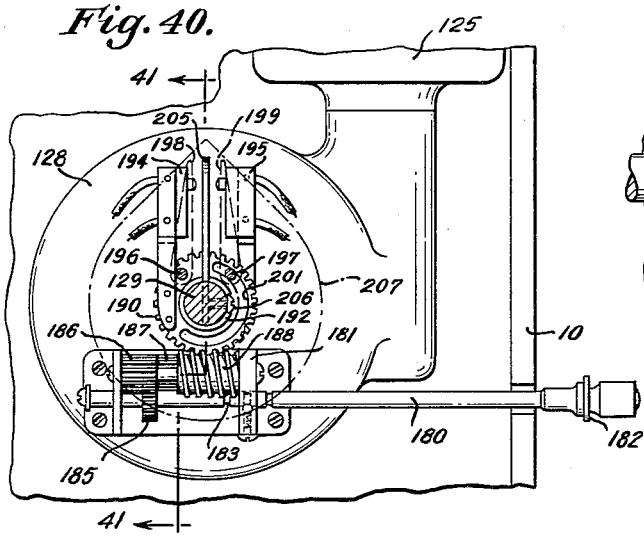
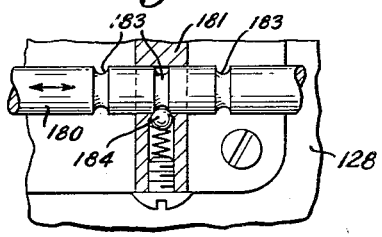
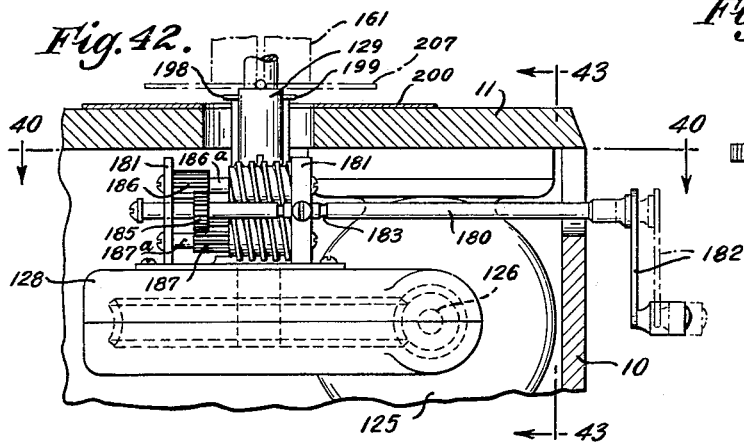
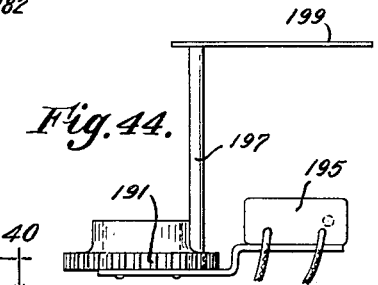
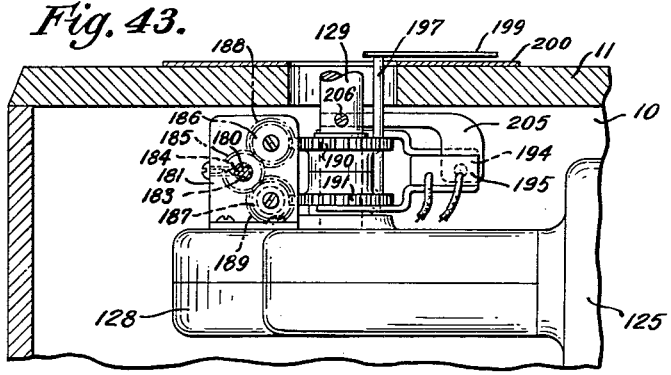
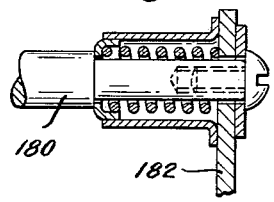
Inventor,
John Barrows,
by Heard, Smith, Porter + Chittick
Attys.

Dec. 13, 1955  J. BARROWS  2,726,817
WINDING MACHINE
Filed June 28, 1952  15 Sheets-Sheet 14
Fig. 41.
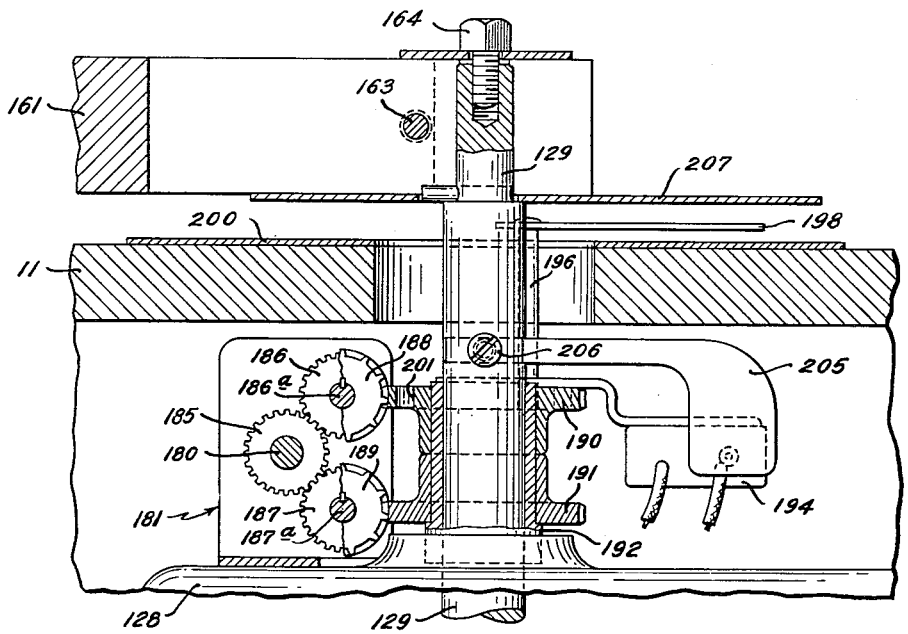
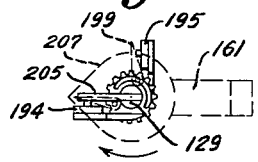
Fig. 47.
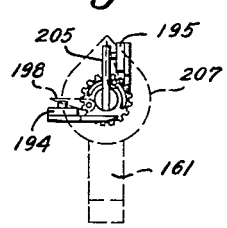
Fig. 48.
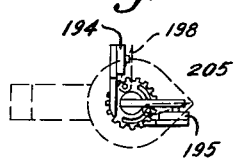
Fig. 49.
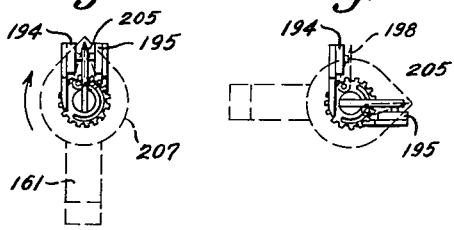
Fig. 50.
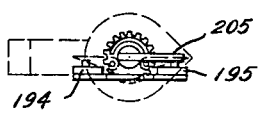
Fig. 51.
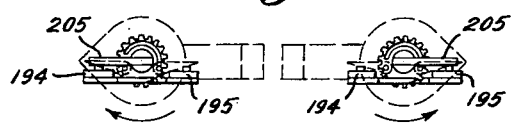
Fig. 52.
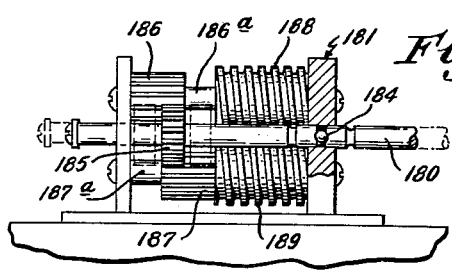
Fig. 53.
Inventor,
John Barrows,
by Heard, Smith, Porter + Chittick
Attys.

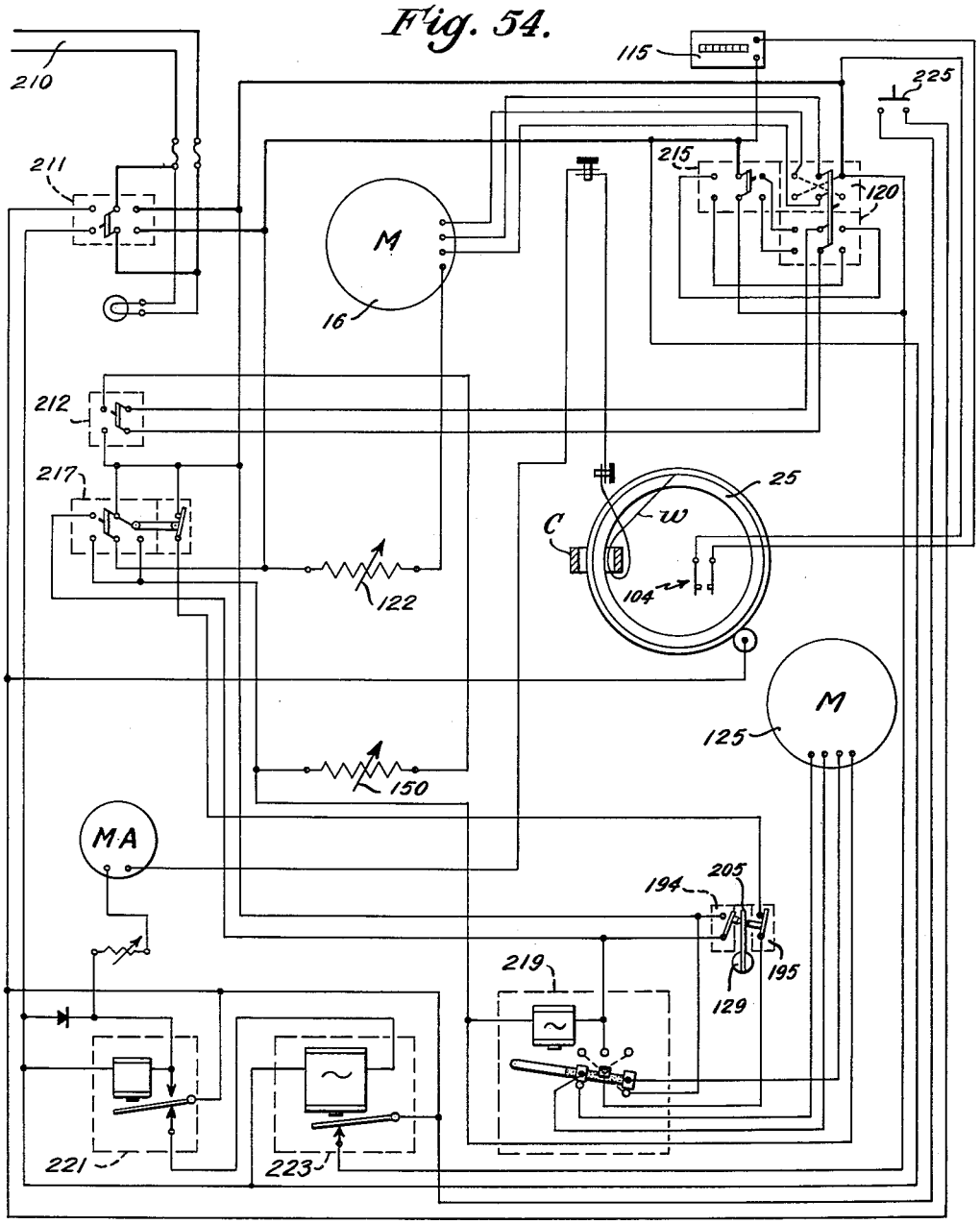

United States Patent Office 2,726,817
Patented Dec. 13, 1955

2,726,817

WINDING MACHINE

John Barrows, Brookline, Mass.

Application June 28, 1952, Serial No. 296,187

17 Claims. (Cl. 242—4)

This invention relates to improvements in toroidal coil winding machines and machines for winding circular or ring-type cores and segmental cores.

The machine of my invention is an improved winding machine, which will wind practically all sizes and types of coils, and with differing gauges of wire and will do this faster and more economically than it can be done on existing machines. One machine with three removable heads will do the work now required to be done on three different machines. It winds coils having a smaller inside diameter than can be wound with existing machines, while maintaining a selectively high stack. The machine counts the number of windings, and in the event of breakage of the wire, the machine is stopped instantly and without losing count of the windings already made. The winding speed is controlled and varied as desired, and so are the spacing, distribution and the number of turns of wire that are placed on a particular coil. The machine will wind any segment of a core up to the full 360°, and will wind automatically any segment of a core from 10° to 220°. A loop control tension device, which can be used with other types of winding machines, is an important feature of my machine, because it permits winding with both lighter and heavier wire than now possible. An improved shuttle and slider or wire guide thereon permits quicker and easier core placement and removal, and faster and more accurate winding, with less breakage of the wire even at higher speeds.

Briefly my winding machine includes a vertical head or support on which is mounted an annular rotating shuttle, which carries the wire and which is rotated to wind the wire onto the toroidal coil or other core. Three separate and removable heads are provided for winding fine wire, medium wire, and heavy wire respectively. The third head for winding heavy wire is shown in a separate application. The shuttles for the fine and medium wire are full rings capable of being opened for insertion of the core, and differ principally only in size. These shuttles carry a bridging slider or guide which pays out the wire from the shuttle and can act as extension control. The shuttle is positively driven from its own motor and the speed of rotation of the shuttle is adjustable and reversible. A separate motor preferably rotates a set of core-rotating rollers, whose speed of rotation is also independently adjustable—which controls the spacing of the windings. A separate clamp is preferably used in place of the core-rotating rollers for winding segmental cores or coils which require oscillation or reversal of movement and in which the angle of oscillation is adjustable through a wide range from about 10 to 220°. A loop control tension device is also preferably added to the machine, because it permits winding with both heavier and lighter wire than possible on present machines. Incorporated in the tension device is a set of contact points to operate an electro-magnetic or electronic counter which is also preferably provided on the machine for recording the number of turns or windings on a particular coil or core, which is particularly useful in the event of breaking of the wire during winding. A stopping device is also provided for stopping the machine when the wire breaks.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Additional advantages and objects of my device will be apparent in the following specification and accompanying drawings, in which Fig. 1 is a general side elevation of the machine;

Fig. 2 is a general plan view of the machine;

Fig. 3 is a general front elevation of the machine;

Fig. 4 is a plan view of coil which may be wound on head No. 2, showing range of inside and outside diameters;

Fig. 5 is a section on line 5—5 of Fig. 4 of coil wound on head No. 2;

Fig. 6 shows range of stack heights and diameters;

Fig. 7 is a plan view of segmental coil as wound using jaw-type insulating clamp;

Fig. 8 is a section on line 8—8 of Fig. 7;

Fig. 9 is a section similar to Fig. 8 but with high stack;

Fig. 12 is a vertical section through winding head No. 1, line 12—12 of Fig. 11;

Fig. 13 is a side elevation similar to Fig. 11 with loop control removed to indicate action of frame hinge;

Fig. 14 is an enlarged fragmentary section of lower shuttle lock in locked position;

Fig. 15 is an enlarged fragmentary section of upper shuttle lock in locked position;

Fig. 16 is a section on line 16—16 of Fig. 15 showing how upper half of shuttle is locked to open frame hinge section prior to opening hinge;

Fig. 17 is a section on line 17—17 of Fig. 13 through spring loaded hinge pivot;

Fig. 18 is an enlarged elevation of shuttle guide roller and mount on frame;

Fig. 19 is a section on line 19—19 of Fig. 18;

Fig. 20 is an enlarged plane view of section of shuttle cover ring containing improved tension device (integral with ring);

Fig. 21 is a fragmentary section on line 21—21 of Fig. 20;

Fig. 22 is an enlarged cross section of loaded shuttle ring with shuttle cover ring in place, line 22 of Fig. 21;

Fig. 23 is an enlarged cross section as above but with auxiliary adapter shuttle ring in place with its cover ring;

Fig. 27 is a fragmentary side elevation of pressure plate type loop control device used with electro-magnetic counter;

Fig. 28 is a vertical section on line 28—28 of Fig. 27 showing loop between plates and magnetic counter operating contact points closed;

Fig. 29 is a fragmentary view after Fig. 28 without loop between plates and contact points separated;

Fig. 30 is a plan section on line 30—30 of Fig. 28;

Fig. 31 is a horizontal section on line 27—27 of Figs. 2 and 32 through operating mechanism of roller type clamping device;

Fig. 32 is a plan section on line 32—32 of Fig. 31 showing roller shaft adjusting arms and general disposition of related parts;

Fig. 33 is a plan section on line 33—33 of Fig. 31 showing relationship of gears in planetary driving system;

Fig. 34 is a fragmentary section on line 34—34 of Fig. 32 showing method of locking two upper roller shafts in place after desired setting;

Fig. 35 is a fragmentary plan view taken from right side of machine base showing combination of second winding head and jaw type clamp;

Fig. 36 is a side elevation of above;

Fig. 37 is a plan section on line 37—37 of Fig. 36 taken above lower jaw of clamp showing method of attaching and adjustment;

Fig. 40 is a plan section on line 40—40 of Fig. 42 of oscillating mechanism showing general disposition of parts;

Fig. 41 is a section on line 41—41 of Fig. 40 taken horizontally through oscillating mechanisms;

Fig. 42 is a vertical elevation of Fig. 40 with machine base in section;

Fig. 43 is a section on line 43—43 of Fig. 42 with mechanism in side elevation;

Fig. 44 is an assembly of right hand microswitch worm gear and pointer unit;

Fig. 45 is a horizontal view through right hand setting gear support plate showing crankshaft adjustments and mechanism setting means;

Fig. 46 is an enlarged sectional view of friction safety device which may be substituted for solid crank base;

Figs. 47 to 51 are series of diagrammatic plan views of oscillating mechanism to indicate setting preparatory to operation;

Fig. 52 is a view after Figs. 47–51 indicating oscillating movement and relationship of parts involved;

Fig. 53 is an enlarged front elevation after Fig. 42 of gear arrangement permitting 3-position independent control in setting oscillating mechanism;

Fig. 54 is a wiring diagram incorporating three interrelated systems:

a. Shuttle drive and control
    b. Coil drive and control—both types
    c. Automatic stopping system.

Figure 1:
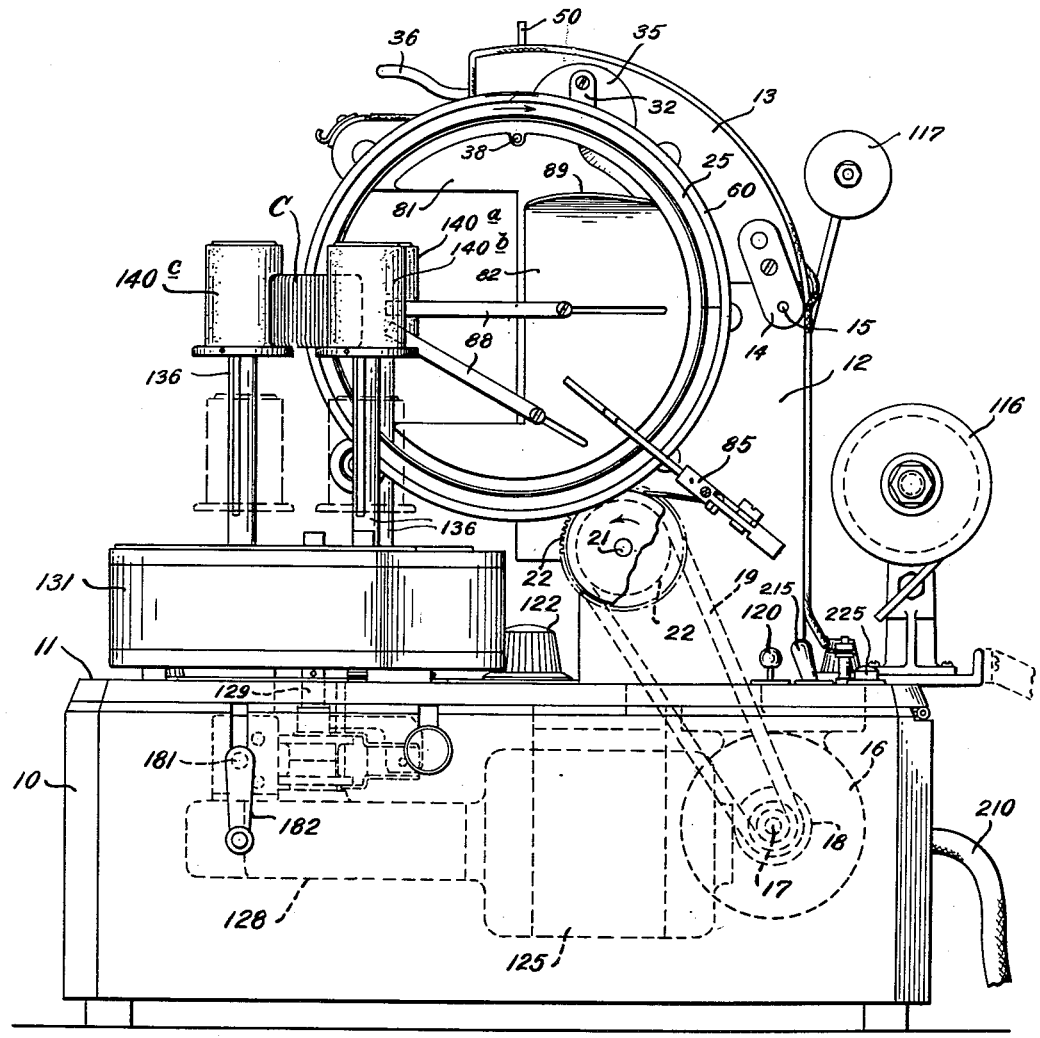
Figure 10:
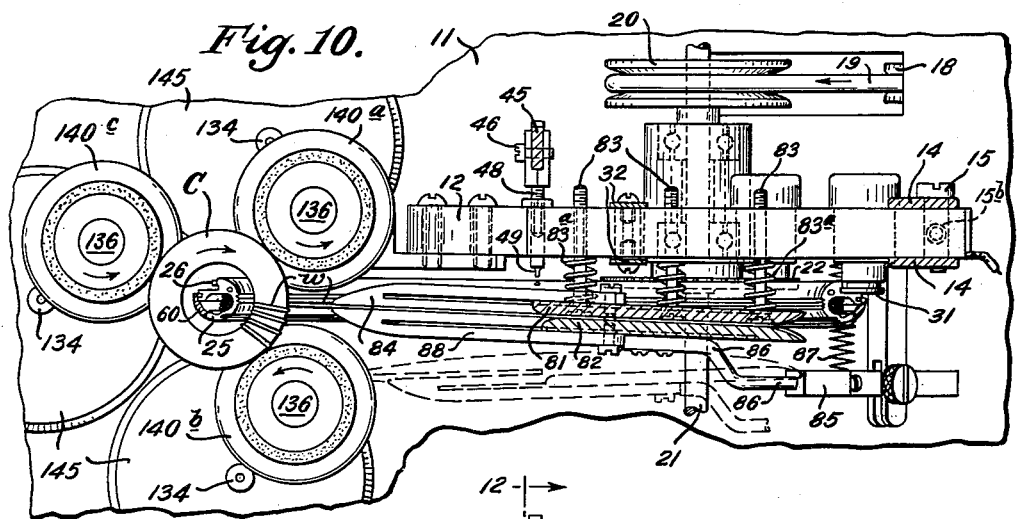
Fig. 10 is a horizontal plan section on line 10—10 of Fig. 11 through winding head No. 1 as combined with roller type clamp showing relationship and disposition of parts.
Figure 11:
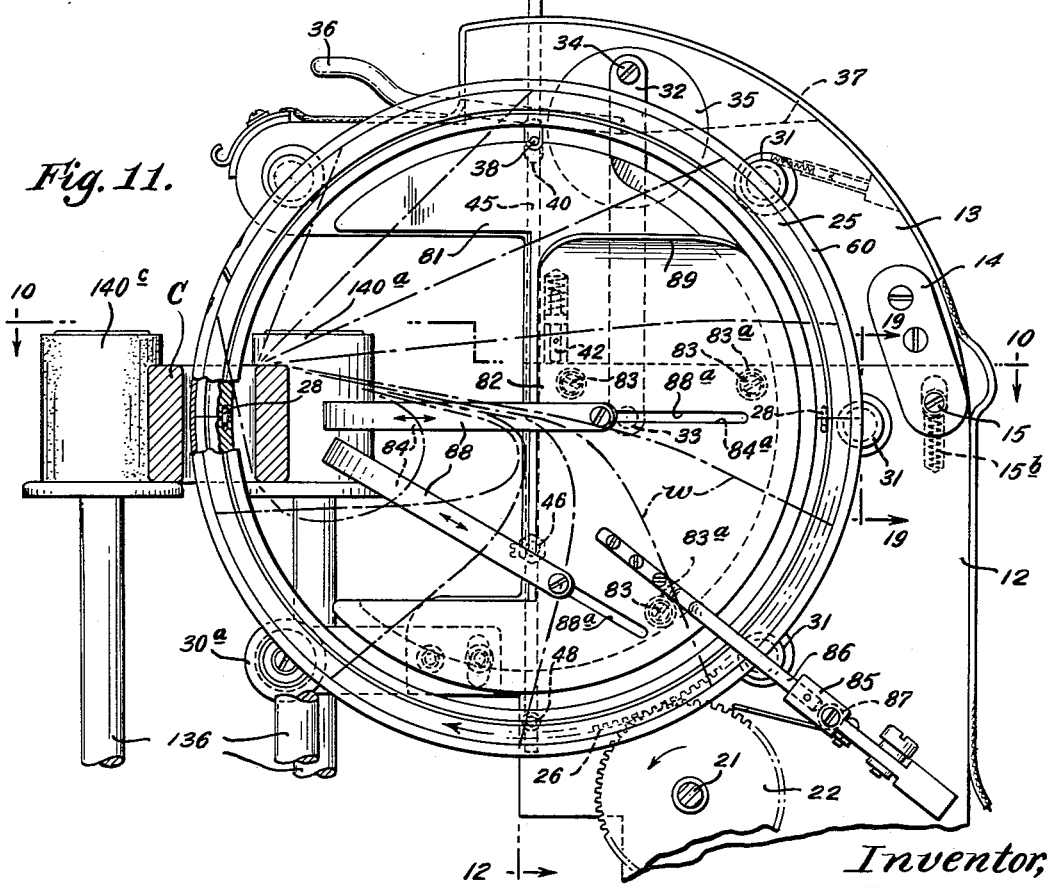
Fig. 11 is a side elevation of winding head No. 1.
Figure 24:
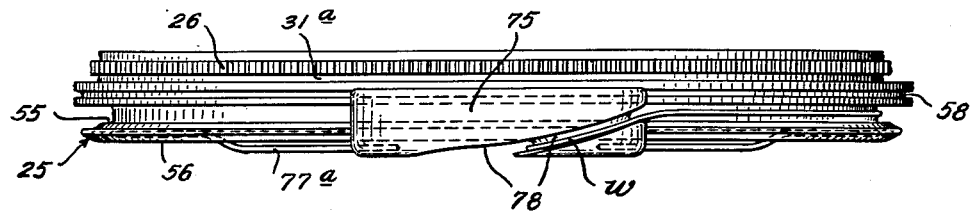
Fig. 24 is an enlarged plan view of bridging slider or wire guide.

In the drawings Figs. 1, 2 and 3 show my winding machine with the first head thereon for winding medium wire from 18 to 36 gauge. The second head for winding finer wire from 22 to 42 gauge is essentially the same as the first head and differs principally in being smaller and lighter. Two types of tension devices for controlling the tension of the wire from the shuttle are also shown, the first type principally in Figs. 1 to 13 and 20–23, and the second in Figs. 24–27. Two forms of loop control tension device are also shown, the first in Figs. 1 to 12 and the second in Figs. 27 to 30.

My machine includes the base 10 of wood, plastic, metal or other suitable material, approximately square and having sides and a top 11 which includes the motors and other operating mechanism. Mounted on the top 11 of the base 10 are the other principal operating parts. These include a vertical head 12 supported in any suitable fashion on the top 11 as by bolts (not shown). The head 12 has a separate upper portion 13 hinged to it by the clamping strips 14 and which pivots about the bolt 15, to open up as shown in Fig. 13 which permits opening of the shuttle to insert the core C to be wound. An electric motor 16 is mounted on the underside of table top 11, the shaft 17 of which drives the pulley 18 and the belt 19, in turn connected to the pulley 20 mounted on shaft 21. A set of suitable reduction gears (not shown) serves to drive gear 22 also mounted on shaft 21 and which in turn rotates the shuttle 25, through cooperating gear teeth 26 (Fig. 3) on the inner side of shuttle 25. Shuttle 25 is an annular member, divided into two separate halves, the two halves being centered by pins 28 (best shown in Fig. 13) and held together by a series of spaced eccentrically pivoted rollers 30 mounted on head 12. The rollers 30 are adjustably mounted to hold the shuttle 25 together with a predetermined tension and to allow adjustment for wear. A roller 30 is shown in more detail in Figs. 18, 19, and 22. Roller 30 carries a collar 31 which inserts into a corresponding groove or track 31a on the inside of shuttle 25 and behind the gear teeth 26.

As previously described, the head 12 includes a hinged upper portion 13 pivoting about the pin 15, with the upper and lower portions of the head held together by the clamping strips 14. Means is provided for opening the jaws of the head and to split the shutile 25 into its two halves and to permit insertion of the shuttle 25 into the core C as shown in Fig. 13. A pair of straps 32 are mounted on inside and outside of head 12 toward the opening end of the hinged jaws connecting the lower portion and upper portion of the head 12. The lower end of the straps 32 are connected by a screw 33 and at their upper ends by the screw 34 in turn connected to a rotatable circular plug 35 mounted in the upper portion 13 of head 12. A handle 36 is fixed to plug 35 and is movable in a groove or slot 37 provided in the top of upper portions 13 of head 12. It will be understood that plug 35 may be rotated in a clockwise direction as shown in Fig. 13 by lifting the handle 36. This allows the upper portion 13 of the head 12 to be lifted upwardly hinged about the pivot 15. As shown more clearly in Fig. 13 pin or pivot 15 is mounted in a vertically extending slot 15a and is supported by a spring 15b, which permits upper portion 13 of head 12 to be lifted slightly above its lower portion. Means is provided to hold the upper half of the shuttle 25 upwardly against the upper series of rollers 30, which comprises a horizontal pin 38 mounted on stem 39 in a vertical slot 40 (Figs. 13, 15 and 16) which is upwardly pressed by the coil spring 41, when movement of locking latch unlocks handle 36. By this means the upper half of shuttle 25 is carried with the upper portion 13 of the head 12 when it is opened up. A second spring pressed pin 42 (Fig. 13), cooperating with spring 15b serves to press the upper portion 13 of the head 12 upwardly, and to separate the two halves of the shuttle 25 vertically before opening in order to clear pins 28 and to allow pin 38 to lock upper half of shuttle as described below. Locking means is provided for locking the upper portion 13 of the head 12 together, and hence locking the two halves of the shuttle 25 together. This means includes a vertically extending lever 45 pivoted about the horizontal pin 46 (Figs. 3, 12 and 15) pressed inwardly (from the right as shown by the broken line position in Fig. 12) at the bottom thereof by means of the spring pressed pin 48. The pin 48 carries a spring which normally presses against the inside of the head 82, pin 48 and the head 12 and pushes out the lower end of lever 45, and in turn pushing inwardly the upper end of lever 45 into the groove 37 (Fig. 12). In this position pointed end 49 of pin 48 is clear of the shuttle. The upper end of lever 45 carries an enlarged portion constituting a latch 50 which extends into the groove 37 on the upper portion 13 of the head 12 and forms a lock for the two halves of the head as well as for the handle 36. A single horizontal hole 49a is provided on the inner side of the bottom half of the shuttle 25 at approximately its center and when the hole is opposite the pointed end 49 of the pin 48 the upper end of locking lever 45 may be pushed outwardly (to the right as shown in broken lines on Fig. 14) causing pointed end 49 to enter the hole 49a in the shuttle 25, thus locking the lower half of the shuttle in rollers 30 and permitting the handle 36 to be lifted to open the lower half of head 12. Thereupon with the lifting of handle 36 the upper portion 13 of head 12 is also lifted, carrying with it the upper half of the shuttle 25. The shuttle 25 can then be inserted inside the core C (Fig. 13). Closing the head and locking it merely involves a reversal of the above procedure except that after the handle 36 has been swung back to closing position, manual pressure is applied on the head in order to counteract the pressure of spring pins 42 and 15 before latch portion 50 can be returned to locking position over the handle 36. If for any reason it is desired to remove the upper portion of the shuttle 25, this can readily be done by pressing downwardly on the horizontal pin 38 (as shown more particularly in Figs. 15 and 22). The shuttle 25 is an annular member carrying on its inside the row of gear teeth 26 and the groove or track 31a in which travels the collar 31 of the rollers 30. Shuttle 25 is rotated in either a clockwise or counter-clockwise direction by means of the driving gear 22 driven from the electric motor 16 and shaft 21. The shuttle 25 is provided with a wire carrying groove 55 in which threads of the wire w are wound from a suitable source of supply. Wire carrying groove 55 is defined by the cylindrical side 56 and by the substantially parallel web 57, leaving an opening at the top of the groove 55 from which the wire is withdrawn and payed out by the tension device or slider described below. A groove 58 is provided in the top of web 57 to receive a corresponding rib on the ring tension device or slider described below. A second and oppositely extending groove 59 is provided on the underside of side 56 to receive a corresponding rib in the slider tensioning device.

Two forms of tensioning devices for the shuttle 25 are shown. The first is a split ring 60 (Figs. 1, 2, 3, 12, 14, 15, 16, 20, 21 and 22). As shown in more detail in Figs. 20, 21 and 22, tension device 60 spans the top or gap of the wire carrying groove 55 and it will be understood that the strand of wire w is pulled out from beneath the lower edge of the ring 60 (as shown in Fig. 22). Sufficient tension control for the wire strand w is provided by the spring connection connecting the split ends of the ring 60. A horizontal groove 61 is provided in the adjacent split ends 60a and b of ring 60 in which is inserted a coil spring 62 which carries an extending finger 63 having a hook 64 on the end thereof which hooks under an abutment 65 provided in groove 61 in the end 60a. A threaded adjusting screw 66 provides means for adjusting the tension of coil spring 62 and hence controls the tension provided by the ring 60, particularly for varying sizes of wire. If desired, it will be understood that the wire carrying capacity of shuttle 25 may be enlarged by means of a threaded attachment which in effect is a second wire carrying groove corresponding to groove 55. Such an attachment is shown in Fig. 23 and comprises a member 68 having a threaded edge 69 engaging cooperating threads 69a provided on the underside of shuttle 25 (Figs. 22 and 23), and an upstanding rib 70 engaging groove 59 and upstanding side 71 defined by the outer side of the second wire carrying groove. It will be understood that an enlarged ring tension device extends over the open tops of the two wire carrying grooves and that the wire is payed out from under the lower edge of the ring 60' as shown in Fig. 23. Such an attachment eliminates the necessity of splicing wires when a longer length of wire is needed for winding any particular coils.

Figure 25:
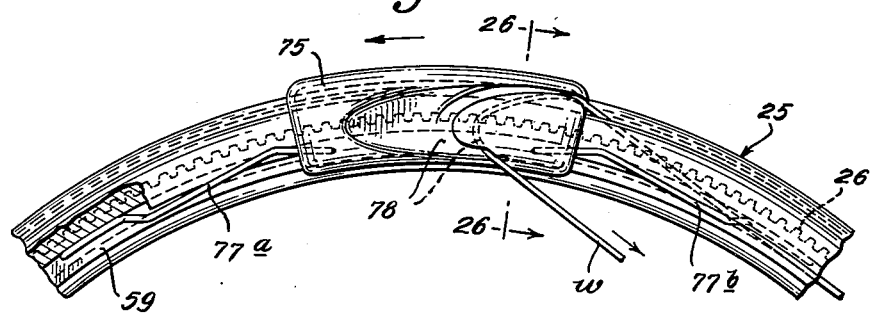
Fig. 25 is a side elevation of above.
Figure 26:
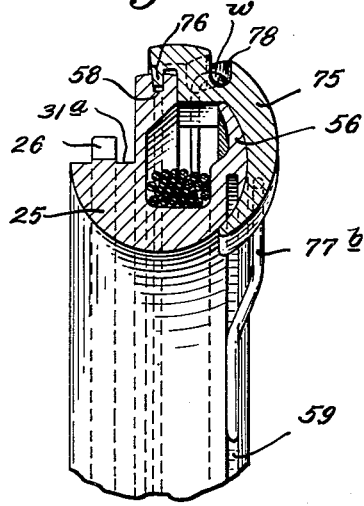
Fig. 26 is an enlarged section on line 26—26 of Fig. 25.
Figure 38:
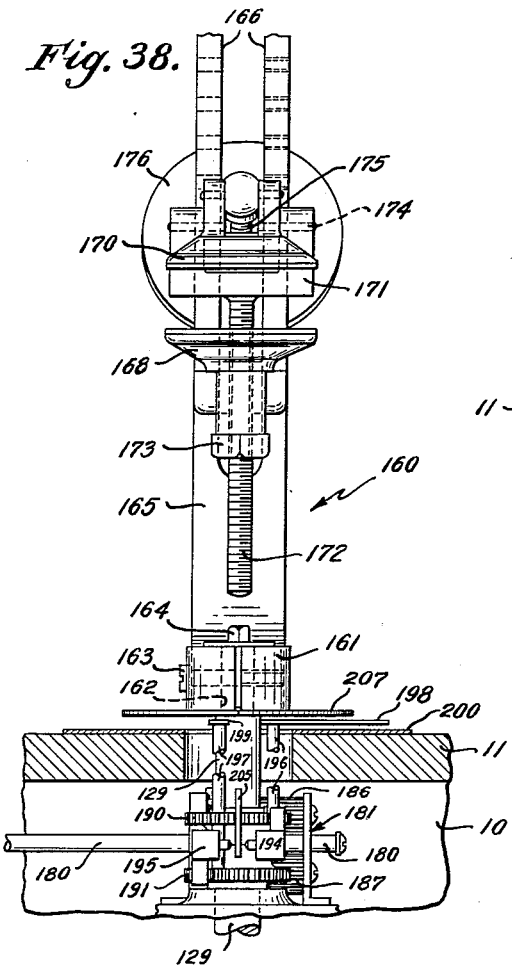
Fig. 38 is a vertical section on line 38—38 of Fig. 36 looking toward jaws and jaw clamping mechanism and with clamp drive and oscillating mechanism in section.

My second forms of tension device for the shuttle 25 is shown in Figs. 24, 25, 26 and 27, and comprises a slider 75 which is mounted on the shuttle 25 and is free to slide longitudinally on shuttle 25. Slider 75 comprises an elongated curved member made of metal or other suitable material, designed to be mounted on the shuttle 25 and to span or bridge over the top of the wire carrying groove 55. For this purpose the slider 75 is provided with a downwardly extending rib 76 on its upper edges designed to fit into groove 58 on the top of web 57 of the shuttle 25. On its lower outside edge slider 75 is provided with two spring fingers 77a and 77b extending in opposite directions from the ends of slider 75 and designed to slide in groove 59 on the lower side of side 56 of the shuttle 25. Spring fingers 77a and 77b are bent to ride in the groove 59 and the tension of slider 75 may be varied by bending the fingers 77a and 77b. A longitudinally extending groove 78 is provided on the outside of slider 75 and extends from the top rear edge of slider 75 to its lower edge, to guide the wire strand w as it is payed off from the shuttle 25 for winding on the core C. It will be understood that slider 75 normally travels with shuttle 25 as it rotates in a counter-clockwise direction (as shown in Fig. 25) for winding the core C. It will be understood of course that shuttle 25 may be reversed in its direction of rotation through the reversible motor 16. However, when the track or pulley on the wire strand w exceeds the frictional engagements of slider 75 on shuttle 25, slider 75 is free to slide on shuttle 25, thereby relieving the tension placed on wire strand w during winding and to avoid breakage of the wire strand w during winding. The advantage of the bridging slider 75 is that it covers or spans the wire carrying groove 55 and transfers the load to the center of the shuttle rather than to one side of it, thereby preventing twisting stresses and pulling action on the shuttle. This in turn permits a heavier wire to be wound on the core C, as heavy as gauge No. 17 magnetic wire. Another advantage of the bridging slider is that the tension of the slider 75 can be quickly adjusted by merely removing the slider 75 from the shuttle by bending the fingers 77a and 77b. The present practice requires the removal of the wire wound on the shuttle, snapping the shuttle open to remove the slider and substituting a heavier slider or adjusting the tension device.

It will be understood that ring tension devices 60, 61' and slider tension device 75 controls the tension placed on the wire strand w as it is being payed out from the shuttle 25.

To control the tension of the wire after it has been payed out from the shuttle 25, and while it is being wound on the core C, I provide a loop control tension device, to keep the wire taut at all times and to prevent it from jumping out of the groove 78 on the slider 75 for instance. I show two such loop control tension devices in my application, the first being shown in Figs. 1, 2, 3, 10, 11 and 12, and the second being shown in Figs. 27 and 28, the second device being the preferred form. My first loop control tension device 80, as shown in Figs. 1, 2, 3, 10, 11 and 12, comprises two metal plates 81 and 82 mounted in parallel and engaging relation on head 12, so that the loop of wire passes around and between the two plates, with the loop of wire being held extended and taut while the point on shuttle 25 from which the wire strand is being drawn or payed out (from the slider 75 for instance) is in the upward part of its cycle of rotation. Plate 81 is the rear plate and plate 82 is the front plate held in engaging relation therewith. Plate 81 is held yieldingly mounted on head 12 by means of spring tensioned spacers 83 (Figs. 2, 10, 11 and 12) encircled by coil springs 83a. The outer edge of plate 81 flares slightly to provide a guideway for guiding the loop of wire between the two plates 81 and 82. Adjustable fingers 84 are provided in slots 84a on plate 81 to control the wire loop to the core C depending on the size of the core C. Front plate 82 in turn is mounted on head 12 by means of a hinged socket 85 in which an arm 86 is fixedly mounted. Hinged socket 85 is tensioned by spring 87 to hold plate 82 inwardly in engagement with plate 81 at all times. An adjustable finger 88 is mounted for horizontal movement in slot 88a and corresponds exactly to the horizontally movable fingers 84 on plate 81. Plate 82 is provided with an outwardly flaring flange 89 (Figs. 3 and 12), and again the peripheral edge of plate 82 is flared outwardly to provide a guideway with flange 89 for guiding the wire strand between the two plates 81 and 82. Plate 82 is movable outwardly to the dotted line position shown in Fig. 12 through the hinged socket 85.

My second form of loop control tension device is preferred because it is more sensitive and an electromagnetic or electronic counter can be readily incorporated with it, to count the number of turns of wire made on each core C. My second form of loop control tension device 90 (as shown in Figs. 27 and 28) comprises two plates, a rear plate 91 mounted on head 12 by threaded bolt 93, and front plate 92 hingedly mounted at its bottom to plate 91 on pin 94 (Fig. 29). It will be understood that the shuttle 25 passes between the bottom extensions or legs supporting the two plates 91 and 92. Plate 92 is held in parallel and engaging relation to plate 91 by means of coil spring 95, the tension of which is adjustable by means of threaded screw 96 (Figs. 29 and 30). The outer peripheral edges of both plates 91 and 92 are flared outwardly to guide the wire loop between the two plates, as best shown in Fig. 28, at 91a and 92a respectively. It will be understood that plate 91 is pivotally mounted on bolt 93 so that the tension device 90 is pivotally movable in a vertical plane parallel to the rotation of shuttle 25 and hence is adjustable in spacing depending on the size of the core C. As best shown in Figs. 28 and 29 I provide a contact mechanism 100 for an electronic or electro-magnetic counter 115 (Fig. 54). It will be understood that the contact mechanism is operated by the spreading of plate 92 and plate 91 about the pivot 94 as the wire loop passes between the plates. For this purpose a bracket 102 is mounted on the bottom side of plate 92 which carries a pair of contact points 104, contact 104a being fixedly mounted on bracket 102, and contact 104b being movably and adjustably mounted thereon. It will be understood that contact points 104a and b are normally open. Movable contact 104b is mounted on arm 105 pivotally mounted on pin 106, and tensioned by leaf spring 107 toward the movable adjusting arm 108, from which arm 105 is held spaced by means of spacer 109 of insulating material. Adjusting arm 108 is pivoted for movement about a horizontal axis on pivot pin 110 and includes a downward extension 111 through which a threaded adjusting screw 112 passes encircled by coil spring 113. Adjusting arm 108 also carries the upward extension 114 which contacts spacer 109 to hold arm 105 and contact 104b in open and spaced relation from fixed contact point 104a. It will be noted from this construction that as the wire loop passes through the plates 91 and 92 it moves plate 92 outwardly the distance of the diameter of the wire w, and contact points 104a and 104b adjustably spaced through adjusting arm 108 a similar distance, and to be closed on the outward movement of plate 92 which carries contact 104a fixedly mounted thereon into contact with contact point 104b, and thereby completing an electric circuit through to the counter 115, thus each rotation of shuttle 25 carrying a strand or loop of wire for winding around the core C causes plate 92 to move upwardly each time to make contact between the contact points 104a and b, and thus count the turns of wire on the core C. But it will be noted that by means of adjusting arm 108 operating through adjusting screw 112 that the spacing between contact points 104a and b can be regulated for the particular gauge of wire being wound.

It will be understood as explained above, that the second head for winding finer wire, with its shuttle 25 is in all essential respects the same as the first head except smaller in size and therefore need not be separately described.

The great advantage of my second loop control tension device 90 is that it relieves the pulling stresses on the shuttle and slider and hence on the wire w, particularly as the slider progresses in its upward movement with the shuttle in their cycle of rotation. It will be noted (from Fig. 27) that as the slider 75 begins to move upwardly from its bottom position in the cycle of rotation that my loop control tension device 90 causes the wire to be pulled over the slider 75 from the position of point a which is behind the slider 75, and hence that slider 75 may slide backwardly on the shuttle 25 if so required by the pull of the wire, thus relieving the tension on the wire w. Without my loop control tension device 90, as the slider begins its upward movement with the shuttle, the pressure of the slider against the shuttle increases as it approaches the horizontal or right angle position in relation to the core C and in this position the pull of the wire from the core C to the slider is approximately vertical to the slider. The great pulling force thus exerted by the wire on the slider and shuttle horizontally, may either pull out the core C or break the wire w, or distort the shuttle, since at this point the slider 75 cannot slide backwardly on the shuttle 25 and the wire w may be stretched to its breaking point. In my loop control tension device 90, therefore, the point a, which is substantially below the axis of rotation of the shuttle, keeps the pulling angle of the wire from the slider from becoming greater than approximately 42°. At this angle the pulling force is reduced to a minimum on the shuttle 25 and on the rollers 30. Having the pulling force of the wire on the slider and shuttle exerted from the point a therefore still permits the slider 75 to slide backwardly at all points in its cycle of rotation, and thereby relieving the stresses on the wire. The force exerted by coil spring 95 pulling together the two plates 91 and 92 of my tension device 90 keeps the wire w within the flaring edges thereof and at the point a of the two plates, until the wire w reaches point b. Then the pulling force of the rotating shuttle and slider overcomes the force holding the two plates 91 and 92 together, and the wire w causes them to spread, with the wire assuming the loop position shown in dotted lines in Fig. 27. These relations are shown in the broken line positions of the wire loop in Fig. 27.

It will be understood for the winding operation that the shuttle 25 is first wound with a number of turns of wire w from a suitable source of supply such as the spool 116 (Fig. 1). A wire guide 117 guides the wire into the wire carrying groove 55 of the shuttle 25 during loading. When the shuttle is loaded the wire of course is cut and the loose end of the wire is threaded over the slider 75 and attached to the core C. For both loading the shuttle and rotating the shuttle for winding the core the shuttle 25 is driven from the motor 16. As previously stated motor 16 is reversible and a four contact double throw switch 120 starts the motor 16. For filling the shuttle 25 the shuttle is rotated in a clockwise direction. Then when the shuttle is filled and ready for winding the shuttle is rotated in a counter-clockwise direction by throwing the switch 120 in the opposite direction. Throwing switch 120 to winding position also starts the motor for the core rotating mechanism to be described below. The speed of motor 16 is made adjustable through a suitable speed control generally indicated at 122 (Fig. 2). As such devices are well known it need not be described in detail. It will suffice to state that the permissible range of speed of rotation of the shuttle 25 runs, for the No. 1 head on medium wire (gauges 16 to 38) from approximately 5 to 600

R. P. M., and for head No. 2 fine wire (from gauge 22 to 42), for approximately 5 to 900 R. P. M.

*The core rotating (and oscillating) mechanism*

As stated above, my winding machine winds both annular or toroidal cores and segmental cores. For winding annular and toroidal cores, the cores of course are rotated to place one or more layers of turns of the wire on the core. For segmental cores or partially wound cores, the cores are rotated through a part or arc of a circle and if more than one layer of winding of wire is desired the core is oscillated through the desired number of degrees in the circle. The mechanism for rotating the cores and winding annular and toroidal cores will first be described. This mechanism includes (as shown in Figs. 1, 2, 3, 31–34) the motor 125 mounted on the underside of table top 11, connected in parallel with motor 16, so that the two will be operated simultaneously from main switch 120. Shaft 126 of motor 125 carries suitable worm gears 127 which in turn drives a suitable gear reduction unit generally indicated at 128 having a vertical main driving shaft 129, which extends upwardly through table top 11. On top of table 11 is mounted the direct coil rotating mechanism which includes the main driving gear 130 centrally located in the housing 131 which comprises top and bottom surfaces 131a and b respectively. Three sets of gears one for each core rotating roller are driven from central driving gear 130 and includes an idler gear 132 each idler gear carrying an attached gear above it mounted on central vertical shaft 134. An extension arm 137 mounted on each central shaft 134 carries a vertically extending roller shaft 136 on the bottom end of which is mounted roller gear 135 which engages the pinion gear 133 and is driven therefrom. Rollers 140a, b and c for rotating the core C are carried on the upper end of roller shafts 136 and comprise preferably rubber covered cylinders with the upper portion 141 for engaging the core C and enlarged lower portion 142 providing a supporting flange for the core C. It will be understood that by the mechanism thus described rollers 140 are rotated uniformly and synchronously for rotating the core C, as the wire strand is being wound around it by the shuttle 25. For purposes of distinction the two rollers nearest the axis of rotation of the shuttle 25 are designated as rollers 140a and b, from left to right in Fig. 2, and the third roller is designated as 140c. Inner rollers 140a and b are adjustably but fixedly positioned in engaging relation with the core C. As previously stated roller shafts 136 carrying rollers 140a and b are pivotally mounted with respect to their vertical central shafts 134, since roller gears 135 are free to travel around the pinion gears 133. An arcuate slot 144 (Fig. 32) is provided in the upper surface 131a of housing 131 in which the roller shaft 136 is free to travel. The radial position of each roller shaft 136 however in relation to its central shaft 134 is adjustably fixed, after the proper position of the shaft is determined from the size of the core C held by the respective rollers 140, by means of a circular plate 145 through which the roller shaft 136 extends, which is rigidly fixed through the slot 144 to the extension arm 137 by means of the threaded screw 146 (Figs. 32 and 34). The third roller 140c on its roller shaft 136c however is adjustably, and not fixedly, positioned with respect to the other two rollers 140a and b. The third roler 140c and its operating mechanism is the same as that operating rollers 140a and b except that its roller shaft 136c is free to move and is not locked in position. However, its extension arm 137 carrying its roller shaft 136c is at all times tensioned inwardly against the core C by means of the coil spring 143 (Fig. 32). In positioning the core C between the rollers 140 the center of the core C is preferably located slightly off center toward the axis of rotation of the shuttle 25, so that as the winding is built up on the core C the core C will be moved away from the axis of rotation of shuttle 25, carrying roller 140c with it.

The speed of motor 125 is also adjustably controlled by a suitable speed control device generally indicated at 150 (Figs. 2 and 54), and hence the speed of rotation of core rotating rollers 140a, b and c. It will of course be readily understood that the speed of rotation of rollers 140 and hence core C determines the spacing of the windings on core C, and necessarily as the speed of rotation of shuttle 25 is changed for any particular core the speed of rotation of rollers 140 is proportionately changed. In commercial operation, it will be understood that the position of rollers 140a and b is first determined from the core to be wound and the relative speed of rotation of shuttle 25 and core rotating rollers 140 is determined by winding a sample coil, or from prepared tables. My winding machine of course continues winding on any particular coil until the desired number of turns of wire are placed upon the core, when the machine can be manually stopped, or through a suitable automatic counter 115.

The core oscillating mechanism for winding segmental coils is shown in Figs. 35–53 and is operated from the same driving mechanism which operates the core rotating mechanism. But in this case all of the core rotating mechanism above the top 11 of the base 10 is removed from the vertical main driving shaft 129, and replaced by the core oscillating mechanism now to be described. The core oscillating mechanism comprises an L-shaped oscillating arm generally indicated at 160 whose horizontal portion 161 is split vertically and a central hole is provided in the end thereof to clamp onto the upper end of main driving shaft 129, being clamped thereto by means of threaded screw 163 and capping screw 164. The vertical portion 165 of oscillating arm is also slotted vertically at 166 to receive the base portions of the core clamping jaws, and whereby the position of said jaws may be adjusted vertically on said oscillating arm. Lower clamping jaw 168 comprises a base set in slot 166 and fixed therein by means of bolt 169 (Figs. 36 and 37) and is preferably one solid piece of metal. The upper clamping jaw 170 is adjustably mounted with respect to lower clamping jaw 168, and includes a vertically extending fork 171 having a downwardly extending threaded bolt 172, the base of which with respect to lower clamping jaw 168 is determined by the threaded nut 173. Upper clamping jaw 170 is pivotally mounted in the vertical arms of fork 171 about pin 174, and in turn carries spaced vertically extending arms to which a threaded shaft 175 is attached at one end. Threaded shaft 175 is supported at its other end in slot 166 in the vertical portion 165 of the oscillating arm 160, and a crank arm 176 with handle 177 is provided at the end of shaft 175, whereby the shaft 175 may be rotated to raise and lower upper clamping jaw 170, as shown in Fig. 36. Clamping jaws 168 and 170 are preferably rubber coated for gripping core C (Fig. 36).

As explained above, the main core rotating mechanism includes the motor 125, its shaft 126, worm gears 127, the gear reduction housing 128 and the main driving shaft 129. The main core rotating driving shaft 129 rotates continuously in one direction as long as desired until the core C is fully wound. But in winding segmental cores the direction of rotation of main driving shaft 129 is reversed at predetermined angles. The oscillating arm 160 having been substituted for the core rotating mechanism above the top 11 of the base 10 on main driving shaft 129, the means for oscillating the arm 160 and adjusting its degree of oscillation includes the following mechanism:

As shown more particularly in Figs. 38 to 52 a space is provided above gear reduction housing 128 and below the top 11 of the base for the oscillating mechanism which is mounted on an adjacent vertical driving shaft 129. A horizontal shaft 180 is mounted in a bracket 181 in turn mounted on gear reduction housing 128 and at shaft 180 at its other end extends through the side of the base 10 and carries a crank handle 182 for manually rotating shaft 180. A detail of the means for attaching crank 182 to shaft 180 is shown in Fig. 46. Shaft 180 operates a gear train for changing the direction and point change of direction of microswitches which determine the angle of oscillation of the operating arm. Shaft 180 is movable laterally and horizontally to three positions, and carries three transverse grooves 183 (Figs. 40, 42 and 45) wherein the lateral position of shaft 180 is fixed by means of a spring pressed ball bearing 184. The right hand groove 183 determines the position of the right hand micro switch and its pointer and the left hand groove determines the position of the left hand microswitch and its pointer. The central groove 183 determines the position of the microswitches when they are locked together in predetermined degree. The change-position gears include the sliding gear 185 fixed on the inner end of shaft 180, and which meshes with spur gears 186 and 187 fixedly mounted on spur shafts 186a and 187a respectively (Fig. 41). On the opposite end of spur shaft 186a is carried the worm drive 188 (Fig. 41) and on the opposite end of spur shaft 187a is the worm drive 189. Worm drives 188 and 189 mesh respectively with gears 190 and 191 which are freely mounted on a stationary bushing 192 on the central driving shaft 129. Upper gear 190 in turn carries the left hand microswitch 194 which determines the limit of oscillation to the left of oscillating arm 160. A vertical arm 196 is also mounted on upper gear 190 and carries the left hand pointer 198, which extends above the dial plate 200 having degrees of angles marked thereon and which is mounted on the top 11 of the base. Left hand pointer 198 at all times indicates the position of the left hand microswitch 194 beneath it under the top 11 of the base (Figs. 40 and 41). Similarly the right hand microswitch 195 is mounted on lower gear 191 (as shown in Fig. 44) and arm 197 extending through an arcuate slot 201 provided in upper gear 190 (Fig. 40) carries the right hand pointer 199. A tripping bar 205 is horizontally fixed on main vertical driving shaft 129 at right angles thereto by screw 206 (Figs. 40, 41 and 43) and carries a downwardly extending portion, and as main driving shaft 129 rotates it will be seen that tripping arm 205 will make contact with left hand microswitches 194 for instance (depending on the direction of rotation of shaft 129) and which will complete an electrical circuit through reversing relay 219 described below which will cause motor 125 to reverse its direction of rotation. Shaft 129 carrying tripping arm 205 will then rotate in the opposite direction until contact is made with right hand microswitch 195, when the direction of rotation of motor 125 will be again reversed. Thus depending upon the set position of left and right hand microswitches 194 and 195 oscillating arm 160 will oscillate and thus wind the core C in the segment of a circle.

The starting positions of both left and right hand microswitches 194 and 195 are both adjustable through horizontal shaft 180 rotated by crank handle 182. As stated above shaft 180 is normally positioned in its central locking point on central groove 183 (Figs. 42 and 45), and to set the position of the left hand microswitch 194 for instance shaft 180 is moved laterally to the left and is then rotated by handle 182 and through its intermediate gearing until the left hand pointer 198 appears opposite the desired angle on dial 200. This sets the position of the left hand microswitch and its pointer. Then the position of the right hand microswitch is set similarly by pulling shaft 180 to the right and again rotating handle 182 until right hand pointer 199 appears opposite the desired angle on dial 200, which determines the position of the right hand microswitch 195 and its pointer for oscillating arm 160. To indicate at all times the position of tripping bar 205 fixed on main vertical shaft 129 a pointer 207 is in turn mounted on central shaft 129 above dial plate 200 and the left and right hand pointers 198 and 199. In this manner the position of the tripping bar 205 with respect to the left and right hand microswitch 198 and 199 is at all times indicated.

Figure 39:
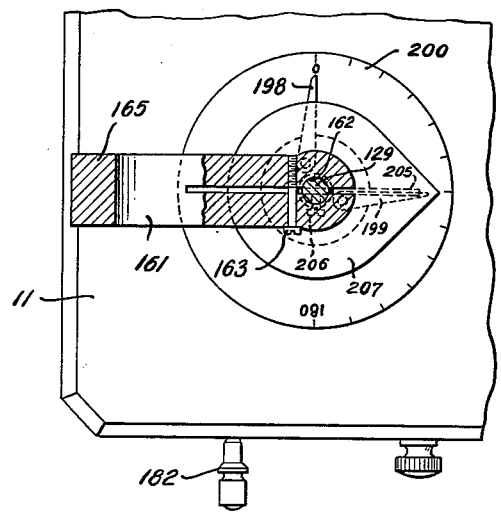
Fig. 39 is a plan section on line 38—38 on Fig. 36 through frame base showing relationship of microswitch pointers, tripping bar indicator and dial.

As an illustration of the segmental cores which my machine is capable of winding (Figs. 7, 8, 9, and 47), I show the position of the left and right hand microswitches 194 and 195 set for winding a 90° segment, with the tripping arm 205 at its left hand position and it will be understood that oscillating arm 160 will oscillate within the 90° there shown and will then reverse. Fig. 39 shows a similar view of the left and right pointers and pointer for the tripping bar from the top of the dial 200, as is shown beneath the dial in Fig. 47. Fig. 48 shows the tripping arm 205 at the right hand microswitch, which is the limit of its right hand movement and will then reverse. Fig. 49 shows the left and right hand microswitches brought together and no oscillation will result. Fig. 50 shows how a second segment of 90° may be wound, on the same core if desired. Figs. 51 and 52 show the respective positions of the microswitches and tripping bar for winding the 180° segment.

My circuit diagram is shown in Fig. 54. A source of power 210 is provided and is brought to main switch 211. The main operating switch for motor 16 is shown at 120. 212 is the cut-in switch for motor 125; 215 auxiliary switch, and 217 the manual control switch for the same motor. At the lower right hand part of the diagram I have shown relay 219 which is operated in conjunction with the oscillating mechanism described in Figs. 40–53 to automatically reverse motor 125 at each end of the pre-set angle when winding segmental coils. At the lower left of the diagram are shown the starting relay 221, and the control and stopping relay 223. These are part of the circuit whereby the machine is stopped automatically in the event of breakage of the strand in the loop, especially as it is being wound. 225 is the restarting button switch in the same circuit. Since this type of control is old it need not be described in further detail. Other corresponding parts in the diagram are designated by the same reference numerals as in the specification.

It will thus be seen that my winding machine is capable of winding all sizes and types of cores in a large range of gauges of wire, with complete adjustability as to speed of winding, the spacing of the wire turns and the like, and that my machine is capable of winding cores which previously could be wound only by hand. It is possible to wind on my machine cores having a height ranging from approximately 1.16" to 4", a diameter ranging from ½" to 6", and a minimum of 9/16" inside diameter. Figs. 7, 8 and 9 give an indication of the general nature and dimensions of cores which can be wound on my machine.

I claim:

1. In a winding machine for winding toroidal coils and segments thereof, a vertically extending support divisible into two separate parts, said two parts being in hinged relation to each other about a horizontal axis, an annular shuttle rotatably carried on said support, divisible into two separate and substantially equal parts, and having a wire carrying groove on its peripheral edge, a plurality of rollers for guiding said shuttle mounted on each of said two parts of said support in engagement with said shuttle, and an interchangeable core rotating and core oscillating means.

2. In a winding machine for winding toroidal coils, a vertically extending support divisible into two separate parts, said two parts being in hinged relation to each other about a horizontal axis, an annular wire carrying shuttle, divisible into two separate and substantially equal parts, a plurality of rollers guiding said shuttle mounted on said support means for locking said parts of said shuttle against said rollers whereby said parts of said shuttle are separated upon movement of one of said parts of said support about said horizontal axis, and a core rotating mechanism including three rollers uniformly driven from a central shaft for engaging said core.

3. In a winding machine for winding toroidal coils, a vertically extending support vertically divisible into two separate parts, an annular shuttle also divisible into two parts, and each having a wire carrying groove on its peripheral edge, a plurality of rollers guiding said shuttle mounted on said support on the outside of said shuttle, means causing said parts of said shuttle to remain in engagement with said rollers as said parts of said shuttle are separated upon separation of said parts of said support, a core rotating mechanism including three rollers uniformly driven from a central shaft for engaging said core, separate motors for rotating said shuttle and for rotating said core, and means for adjustably controlling the speed of rotation of both said shuttle and said core.

4. In a winding machine for winding toroidal coils, a vertically extending support divisible into separate top and bottom parts, said top and bottom parts being hinged together, an annular wire carrying shuttle divisible into two substantially equal parts with each part carried respectively on the separate parts of said support, a plurality of rollers for guiding said shuttle for rotation mounted on said support on the outside of said shuttle, driving means for rotating said shuttle including a motor, and a core rotating mechanism and driving means therefor including a separate motor.

5. In a winding machine for winding toroidal coils, a vertically extending support divisible into separate top and bottom parts, said top and bottom parts being hinged together about a horizontal axis, an annular wire carrying shuttle similarly divisible into two parts with each part carried respectively on the separate parts of said support, a plurality of rollers for guiding said shuttle for rotation mounted on said support on the outside of said shuttle, driving means for rotating said shuttle including a motor, and a core rotating mechanism including three uniformly driven rollers engaging said core.

6. In a winding machine for winding toroidal coils, a vertically extending support divisible into separate top and bottom parts, said top and bottom parts being hinged together, an annular wire carrying shuttle similarly divisible into two parts with each part carried respectively on the separate parts of said support, means for rotating said shuttle including a motor, a rack on said shuttle and a driving gear engaging said rack, and means for adjustably controlling the speed of rotation of said shuttle, a core rotating mechanism including uniformly driven rollers engaging said core, and means for rotating said rollers including a separate motor, and means for adjustably controlling the speed of rotation of said core.

7. In a winding machine for winding toroidal coils, a vertically extending support divisible into two separate parts, said two parts being hinged together about a horizontal axis, an annular wire carrying shuttle divisible into two separate and substantially equal parts carried separately on the parts of said support, means for opening the divided support and shuttle and for locking them in closed position, a plurality of rollers for guiding said shuttle mounted on the two parts of said support on the outside of said shuttle, and means for rotating said shuttle.

8. In a winding machine for winding toroidal coils and segments thereof, a vertically extending support divisible into two separate parts, said two parts being hinged together about a horizontal axis, an annular wire carrying shuttle also divisible into two separate parts carried on said support and having a wire carrying groove on its peripheral edge, a slider bridging said wire carrying groove and slidably engaging said shuttle for controlling the tension of the wire strand wound on a core, a plurality of rollers for guiding said shuttle mounted on said support on the outside of said shuttle, means for rotating said shuttle and separate means for rotating said core.

9. In a winding machine for winding toroidal coils and segments thereof, a vertically extending support divisible into top and bottom parts, said parts being horizontally hinged, an annular wire carrying shuttle also divisible into two separate parts carried on said support and having a wire carrying groove, a slider bridging said wire carrying groove, and slidably engaging said shuttle for controlling the tension of the wire strand wound on a core, a plurality of rollers for guiding said shuttle mounted on said support on the outside of said shuttle, means for rotating said shuttle, a loop control tension device including hinged plates supported in engaging relation and separated by the passing of the wire strand between them while being wound on the core and separate means for rotating said core.

10. In a winding machine for winding toroidal coils and segments thereof, a vertically extending support divisible into top and bottom parts, said parts being hinged about a horizontal axis, an annular wire carrying shuttle also divisible into two separate parts carried on said support and having a wire carrying groove, a slider bridging said wire carrying groove, and slidably engaging said shuttle for controlling the tension of the wire strand wound on a core, a plurality of rollers for guiding said shuttle mounted on said support on the outside of said shuttle, means for rotating said shuttle, a loop control tension device including hinged plates supported in engaging relation and separated by the passing of the wire strand between them while being wound on the core, a counter operated by said loop control tension device, and separate means for rotating said core.

11. In a winding machine for winding toroidal coils and segments thereof, a vertically extending support divisible into two separate parts, an annular wire carrying shuttle also divisible into two separate parts carried on said support, a plurality of rollers for guiding said shuttle mounted on the separate parts of said support and on the outside of said shuttle, a motor for rotating said shuttle, means for adjustably controlling the speed of rotation of said shuttle, a core rotating mechanism including rollers, a separate motor for uniformly rotating said rollers, and an oscillating arm interchangeable with said core rotating rollers driven from the same motor, and automatic means for reversing the direction of said motor and said oscillating arm.

12. In a winding machine for winding toroidal coils and segments thereof, a vertically extending support divisible into two separate parts, an annular wire carrying shuttle also divisible into two separate parts carried on said support, a plurality of rollers for guiding said shuttle mounted on the separate parts of said support and on the outside of said shuttle, a motor for rotating said shuttle, means for adjustably controlling the speed of rotation of said shuttle, a core rotating mechanism including rollers, a separate motor for uniformly rotating said rollers, and means for adjustably controlling the speed of said separate motor and an oscillating arm interchangeable with said core rotating rollers driven from the same motor, and automatic means for reversing the direction of said motor and said oscillating arm.

13. In a winding machine for winding toroidal coils and segments thereof, a vertically extending support divisible into two separate parts, an annular wire carrying shuttle also divisible into two separate parts carried on said support, a plurality of rollers for guiding said shuttle mounted on the separate parts of said support and on the outside of said shuttle, a motor for rotating said shuttle, means for adjustably controlling the speed of rotation of said shuttle, a core rotating mechanism including rollers, a separate motor for uniformly rotating said rollers, and means for adjustably controlling the speed of said separate motor and an oscillating arm interchangeable with said core rotating rollers driven from the same motor, and automatic means for reversing the direction of said motor and said oscillating arm, and means for adjusting the degree of oscillation of said oscillating arm.

14. In a winding machine for winding toroidal coils and segments thereof, a vertically extending support divisible into two separate parts, an annular wire carrying shuttle also divisible into two separate parts carried on said support, a plurality of rollers for guiding said shuttle mounted on the separate parts of said support and on the outside of said shuttle, means for rotating said shuttle including a motor, a rack on said shuttle and a driving gear engaging said rack, means for adjustably controlling the speed of rotation of said shuttle, a core rotating mechanism including three rollers yieldingly engaging said core, means for rotating said core rotating mechanism including a motor driving a central shaft, means for adjustably controlling the speed of rotation of said core, an oscillating arm interchangeable with said core rotating rollers to be mounted on said central shaft, and automatic means for reversing the direction of said motor and the oscillation of said arm.

15. In a winding machine for winding toroidal coils and segments thereof, a vertically extending support divisible into top and bottom parts, said parts being in hinged relation about a horizontal axis, an annular wire carrying shuttle also divisible into two separate parts carried on said support and having a wire carrying groove on its peripheral edge, a slider bridging said wire carrying groove and having bendable fingers slidably and frictionally engaging said shuttle for controlling the tension of the wire strand to be wound on a core, a plurality of rollers for guiding said shuttle mounted on said support on the outside of said shuttle, means for rotating said shuttle, and separate means for rotating said core.

16. In a winding machine for winding toroidal coils and segments thereof, a vertically extending support divisible into top and bottom parts, said parts being hinged to each other, an annular wire carrying shuttle also divisible into two separate parts carried on said support and having a wire carrying groove, a slider bridging said wire carrying groove, and slidably engaging said shuttle for controlling the tension of the wire strand wound on a core, a plurality of rollers for guiding said shuttle mounted on said support on the outside of said shuttle, means for rotating said shuttle, a loop control tension device including two hinged plates supported in engaging relation inside said shuttle and permitting the wire strand to pass between said plates while being wound on the core, and separate means for rotating said core.

17. In a winding machine for winding toroidal coils and segments thereof, a vertically extending support divisible into two separate parts, said two parts being hinged about a horizontal axis, an annular shuttle rotatably carried on said support, divisible into two separate and substantially equal parts and having a wire carrying groove on its peripheral edge, a plurality of rollers for guiding said shuttle mounted on said support on the outside of said shuttle, a rack on said shuttle and a driving gear for rotating said shuttle by engaging said rack, and means for rotating a core.

References Cited in the file of this patent

UNITED STATES PATENTS

| Number | Name | Date |
|---|---|---|
| 928,592 | Downs | July 20, 1909 |
| 1,053,962 | Alexander | Feb. 25, 1913 |
| 1,555,756 | Rauschenbach | Sept. 29, 1925 |
| 2,171,119 | Belits | Aug. 29, 1939 |
| 2,326,969 | Quinlan | Aug. 17, 1943 |
| 2,427,079 | Werth | Sept. 9, 1947 |
| 2,467,643 | Wirth | Apr. 19, 1949 |
| 2,569,657 | De Beauregard | Oct. 2, 1949 |
| 2,653,771 | Turner | Sept. 29, 1953 |

FOREIGN PATENTS

| Number | Country | Date |
|---|---|---|
| 624,213 | Great Britain | May 31, 1949 |